(12) United States Patent
Clynne et al.

(10) Patent No.: US 10,794,868 B2
(45) Date of Patent: Oct. 6, 2020

(54) METHOD AND SYSTEM FOR MULTI-CHANNEL ACOUSTIC COMMUNICATION AND SENSING

(71) Applicant: GE LIGHTING SOLUTIONS, LLC, East Cleveland, OH (US)

(72) Inventors: Thomas Clynne, East Cleveland, OH (US); Rick Dean Dureiko, Willoughby, OH (US)

(73) Assignee: CONSUMER LIGHTING (U.S.), LLC, Norwalk, CT (US)

( * ) Notice: Subject to any disclaimer, the term of this patent is extended or adjusted under 35 U.S.C. 154(b) by 228 days.

(21) Appl. No.: 15/944,707

(22) Filed: Apr. 3, 2018

(65) Prior Publication Data

US 2018/0284070 A1 Oct. 4, 2018

Related U.S. Application Data

(60) Provisional application No. 62/481,074, filed on Apr. 3, 2017.

(51) Int. Cl.
| | | |
|---|---|---|
| *G01N 29/11* | (2006.01) | |
| *G01N 29/07* | (2006.01) | |
| *G08C 17/02* | (2006.01) | |
| *G08C 23/02* | (2006.01) | |
| *H04B 11/00* | (2006.01) | |
| *G01N 29/06* | (2006.01) | |
| *H04W 4/80* | (2018.01) | |
| *H04W 84/18* | (2009.01) | |

(52) U.S. Cl.
CPC ............. *G01N 29/11* (2013.01); *G01N 29/07* (2013.01); *G08C 17/02* (2013.01); *G08C 23/02* (2013.01); *H04B 11/00* (2013.01); *G01N 29/0609* (2013.01); *H04M 2250/12* (2013.01); *H04W 4/80* (2018.02); *H04W 84/18* (2013.01)

(58) Field of Classification Search
CPC ........ G01N 29/11; G01N 29/07; G08C 17/02; G08C 23/02; G01S 15/523; G01S 15/876; G01S 13/1627; G01S 13/56; G01S 15/62; G01S 15/04; G01S 15/18
See application file for complete search history.

(56) References Cited

U.S. PATENT DOCUMENTS 3,838,408 A * 9/1974 McMaster .......... G08B 13/1627
340/501
4,003,045 A * 1/1977 Stockdale .......... G08B 13/1627
367/94

(Continued)

OTHER PUBLICATIONS

International Search Report issued in connection with related case PCT application PCT/US2018/025901 dated Jul. 24, 2018.

*Primary Examiner* — Helen C Kwok
(74) *Attorney, Agent, or Firm* — Wood IP LLC (57) ABSTRACT

Provided is a method and a system for multi-channel acoustic communication and sensing. For example, there is provided a system that includes a processor and a memory. The processor, when executing instructions from the memory, can perform certain operations. The operations can include classifying a motion detected near an ultrasonic receiver based on a Doppler shift observed in a signal measured by the ultrasonic receiver. The classifying can further include detecting a side lobe in a power spectrum of the signal to indicate that the motion has been detected.

20 Claims, 7 Drawing Sheets

(56) References Cited

U.S. PATENT DOCUMENTS

| | | | | |
|---|---|---|---|---|
| 4,035,798 | A * | 7/1977 | Hackett | G01S 13/56 |
| | | | | 367/94 |
| 4,189,719 | A * | 2/1980 | Massa | G08B 13/00 |
| | | | | 340/501 |
| 4,225,858 | A * | 9/1980 | Cole | G01S 13/56 |
| | | | | 340/554 |
| 4,319,349 | A * | 3/1982 | Hackett | G01S 15/523 |
| | | | | 340/554 |
| 4,608,674 | A * | 8/1986 | Guscott | G08B 13/1627 |
| | | | | 340/501 |
| 4,625,199 | A * | 11/1986 | Pantus | G01S 13/862 |
| | | | | 340/521 |
| 5,331,308 | A * | 7/1994 | Buccola | G08B 13/2494 |
| | | | | 340/522 |
| 5,760,687 | A * | 6/1998 | Cousy | G01S 7/415 |
| | | | | 340/554 |
| 5,973,996 | A * | 10/1999 | Zhevelev | G01S 15/523 |
| | | | | 367/99 |
| 6,493,649 | B1 * | 12/2002 | Jones | G01S 5/186 |
| | | | | 367/99 |
| 6,922,145 | B2 * | 7/2005 | Piesinger | G01S 7/415 |
| | | | | 340/506 |
| 2004/0125009 | A1 | 7/2004 | Nishiguchi et al. | |
| 2006/0235635 | A1 | 10/2006 | Intrator et al. | |
| 2009/0046538 | A1 | 2/2009 | Breed | |
| 2012/0143808 | A1 | 6/2012 | Karins | |

* cited by examiner

METHOD AND SYSTEM FOR MULTI-CHANNEL ACOUSTIC COMMUNICATION AND SENSING

CROSS-REFERENCE TO RELATED APPLICATIONS

The present disclosure claims the benefit of U.S. provisional patent application No. 62/481,074, filed Apr. 3, 2017, the contents of which are incorporated by reference herein in their entirety.

BACKGROUND

With the advent of the internet of things (IoT), many devices are being equipped with communication hardware in order to provide additional functionalities. For example, lighting systems can be activated remotely via a smart phone. While IoTs are largely dominated by radio frequency (RF) based communication protocols such as Wi-Fi, Bluetooth, and ZigBee, to name a few, other communication and sensing modalities have been coupled with IoTs. For example, infrared (IR) modules have been deployed in rooms to sense presence or changes within the vicinity of an IR photodetector. Such methods can be costly, and they may require specific hardware to be deployed to interface with existing systems. More importantly however, these sensors may not have the resolution and sensitivity to pick up small disturbances in their vicinity, as they can be line-of-sight sensors.

Yet another obstacle faced by communication-enabled devices is the need to pair with wireless network resources, which requires authentication. As such, control and sensing may be cumbersome as one must connect to the network before the device can be fully enabled. Lastly, another drawback is that typical connected devices typically have dedicated and separate modules for sensing and communication. This latter characteristic makes it difficult to deploy and/or manage large networks of connected devices.

SUMMARY

The embodiments described herein mitigate or solve some or all of the aforementioned issues, in addition to providing capabilities that have thus far not been contemplated in the art. For example, one embodiment provides a system that includes a processor and a memory. The processor, when executing instructions from the memory, can perform certain operations. The operations can include classifying a motion detected proximate to an ultrasonic receiver based on a Doppler shift observed in a signal measured by the ultrasonic receiver. The classifying can further include detecting a side lobe in a power spectrum of the signal to indicate that the motion has been detected.

Another embodiment provides a system that includes a processor and a memory. The processor, when executing instructions from the memory, can perform certain operations. The operations can include sensing motion based on a power spectrum of a signal measured at an acoustic receiver of the system and sensing presence based on the power spectrum. Sensing the motion can be based on an ultrasound region of the power spectrum, and sensing presence can be based on an audio region of the power spectrum.

Another embodiment provides a system that includes a processor and a memory. The processor, when executing instructions from the memory, can perform certain operations. The operations can include transmitting, by a transmitting of the system, an ultrasonic signal including information centered around at least two frequency peaks. The operations can further include receiving the ultrasonic signal by a receiver of the system and determining whether a motion has occurred based on a signal characteristic associated with one of the at least two frequency peaks.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
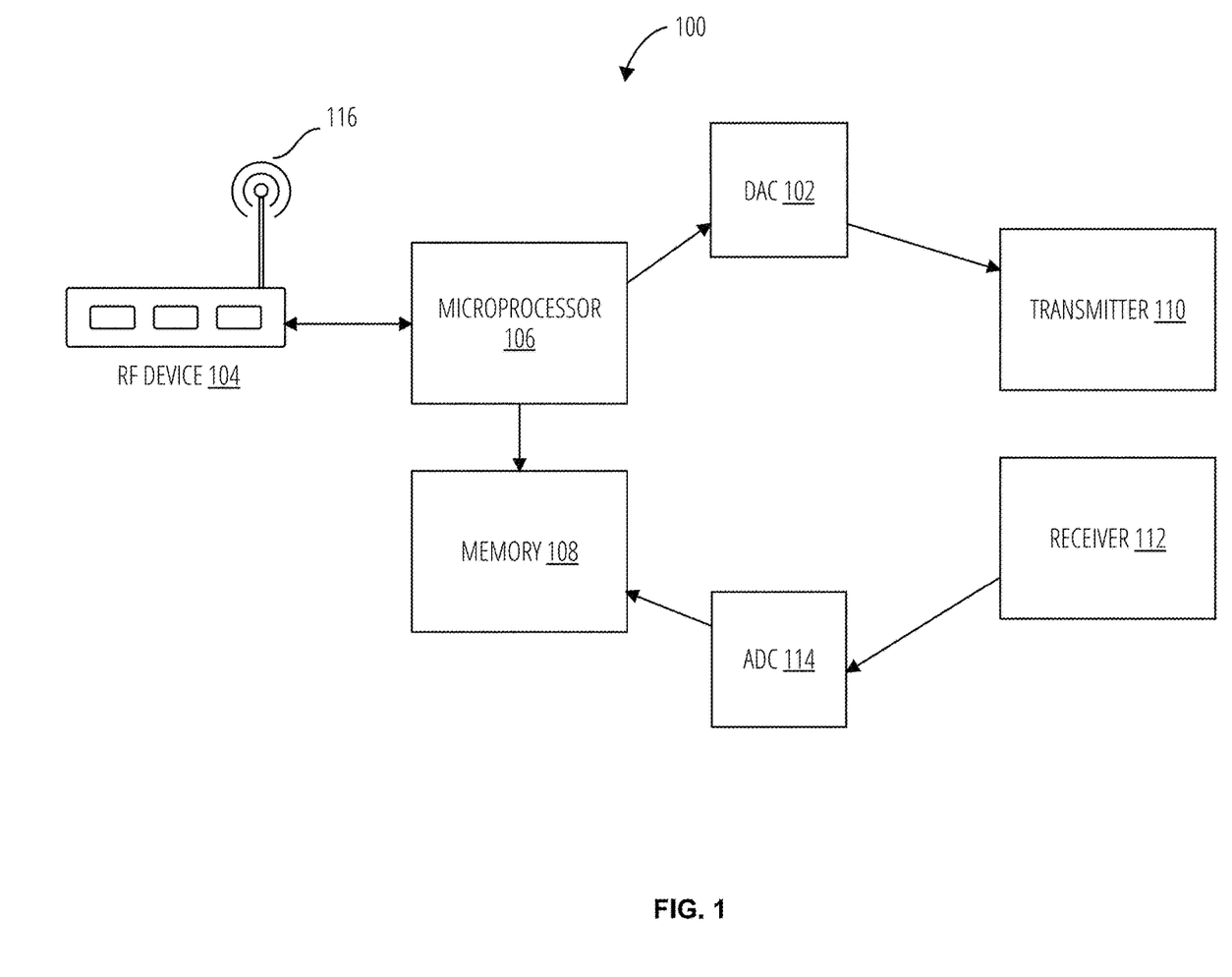
FIG. 1 illustrates a system in accordance with one embodiment.

FIG. 1 shows the block diagram of a system 100 according to one exemplary embodiment. The system 100 comprises a digital to analog (DAC) 102, an RF device 104, a microprocessor 106, a memory 108, a transmitter 110, a receiver 112, an analog to digital (ADC) 114, and an antenna 116. Generally, the system 100 includes a plurality of devices that cooperatively function to cause the system 100 to perform one or more tasks associated with ultrasonic sensing and/or persistent presence occupancy sensing. For example, the system 100 includes an RF device 104 equipped with an antenna 116, a microprocessor 106, a memory 108, a DAC 102, an ADC 114, an ultrasonic transmitter 108, and an ultrasonic receiver 112.

In one exemplary implementation, the RF device 104 can function according to a communication protocol configured to support Wi-Fi or Bluetooth applications. Nevertheless, generally, the RF device 104 can be a device that is configured to support an RF-based protocol in order to provide wireless connectivity between the system 100 and one or more remote devices. For example, the one or more remote devices can be a lighting system that is equipped with RF transceiving hardware and whose state (e.g., a light output intensity) can be queried remotely utilizing the system 100 and/or whose state can be altered upon receiving a command from the system 100.

The microprocessor 106 is an application-specific microprocessor or computing device that is programmed by the instructions included in a memory 108 to perform tasks specific to ultrasonic sensing and/or presence sensing. Generally, the microprocessor 106 is an apparatus that is structured such that it can perform tasks related to ultrasonic sensing and or presence sensing that would not be otherwise possible with a routine or conventional computer.

The DAC 102 is configured to receive a digital command from the microprocessor 106 and output analog voltage that can then be used to transmit an ultrasonic pulse via the transmitter 110. Without limitation, but by example only, the DAC 102 can output a voltage at a fixed analog level corresponding to a unique digital input word, and the fixed analog level can correspondingly cause the transmitter 110 to output an ultrasonic tone having at an intensity corresponding only to the fixed analog level.

In the above-described exemplary configuration, the microprocessor 106 can modulate the ultrasonic output of the transmitter 110 by outputting a sequence of different digital words at one or more input terminals of the DAC 102. Furthermore, without limitation but by example, the DAC 102 can be any one of an R-2R ladder-based DAC, a resistor string DAC, a current steering DAC, a charge scaling DAC, a cyclic DAC, and a pipeline DAC. Generally, the system 100 is not limited to a particular DAC architecture, and one of ordinary skill in the art will readily recognize a suitable DAC architecture based on application-specific constraints.

The ADC 114 is configured to convert an analog output the receiver 112 into a digital word that can be saved in the memory 108. Again, similarly to the DAC 102, the ADC 114 is configured to provide a one-to-one correspondence between its input and output signals. Stated otherwise, the ADC 114 output digital word is unique to a specific analog voltage level at its input port. Accordingly, the specific analog voltage level is specific to an intensity of an ultrasound signal transduced by the receiver 112. As in the case of the DAC 102 the system 100 is not limited to a particular ADC architecture. For example, and not by limitation, the ADC 114 can be any one of a flash ADC, a pipeline ADC, a single-slope ADC, a successive approximation ADC, and a charge redistribution successive approximation ADC, to name a few architectures that are possible.

The transmitter 110 may be an ultrasound emitting device that can be programmed to emit either a narrow band ultrasound at a predetermined frequency, or at wide-band ultrasound signal. Correspondingly, the receiver 112 may be an ultrasound sensor that is configured to pick up an ultrasound signal at a specific center frequency or in a wide band of ultrasonic frequencies. Furthermore, the receiver 112 may also be a wideband receiver 112 configured to pick up audio frequencies as well as ultrasonic frequencies.

One of ordinary skill in the art will readily recognize that the various components shown in FIG. 1 can be implemented on a single circuit board, or they can be distributed over several boards that are either co-located in a single enclosure or on a single mother board, or that are dispersed but communicatively coupled via wired or a wireless connection.

Moreover, one of ordinary skill in the art will readily recognize that in an application a plurality of systems like the system 100 can be used in parallel, e.g. two or more systems like the system 100 can be deployed in a room to provide increased coverage of the room. In yet another implementation, the microprocessor 106 can be central to several pairs of ultrasound receivers and ultrasound transmitters, thereby allowing a distributed ultrasonic transceiver system to be implemented based on the system 100.

Having set forth the structure of the exemplary system 100, several signals generated during the course of its operation are shown in the following figures in order further describe the novel aspects the system 100. These figures are described in the context of the system 100 being deployed in a room, as an exemplary use case. One of ordinary skill in the art will readily recognize that the system 100 may be deployed in any other situation that may benefit from ultrasonic sensing (e.g., a car windshield to detect rainfall, an outdoor lamp to detect weather changes).

Figure 2:
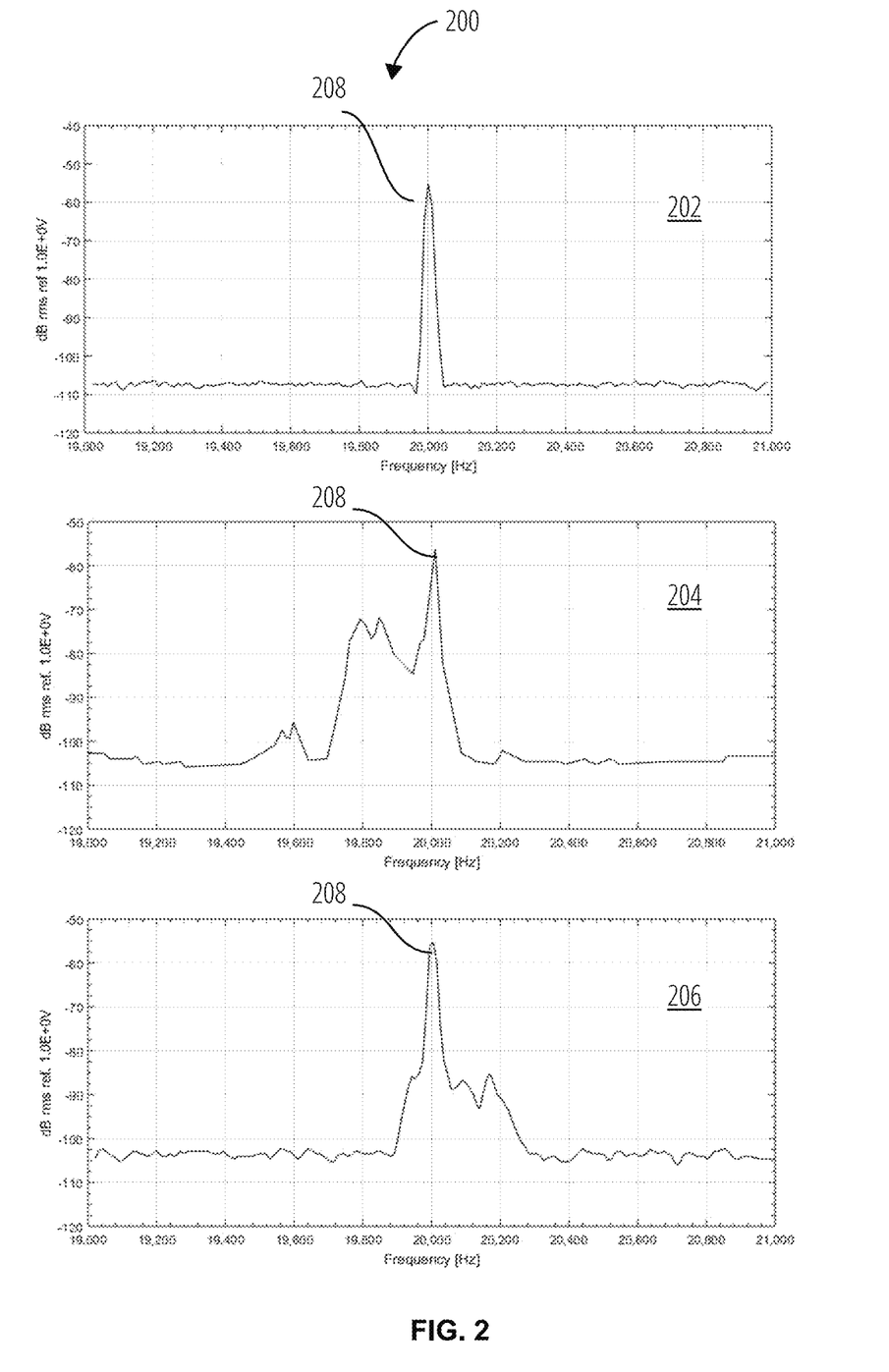
FIG. 2 illustrates a set of spectra in accordance with one embodiment.

FIG. 2 illustrates a set of spectra 200 that may be encountered during an operation of the system 100. For example, the transmitter 110 may emit an ultrasound signal whose frequency spectrum is shown in the spectrum 202. As shown in FIG. 2, the spectrum 202 (and the spectra mentioned hereinafter) is a result of the receiver 112 picking up an ultrasonic signal, transducing it to an output voltage. The ADC 114 digitizes the output voltage into a time-domain series and the microprocessor 106 subsequently executes a routine to generate the spectrum from the time-domain series.

In the spectrum 202, the signal's largest spectral components are centered around about 20 kHz, i.e., at the upper limit of the human auditory range and at the beginning of the ultrasound spectral range. This peak frequency is the peak 208 denoted on the spectra of FIG. 2.

The spectrum 204 is indicative of a change in air pressure or in the acoustic baseline signature of the room. A side lobe is formed to the left of the peak 208. Similarly, the spectrum 206 denotes a change from the baseline, and a side lobe is formed to the right of the peak 208. Accordingly, in one embodiment, the system 100 can be programmed to detect changes from a baseline checking whether a side lobe is present in the spectrum of a known ultrasonic pulse emitted by the transmitter 110. Details of one exemplary technique for performing this type of presence sensing is described in Applicant's patent application No. PCT/US18/25901, entitled System and Method for Presence Detection, filed Apr. 3, 2018, the contents of which are incorporated by reference herein in their entirety.

Furthermore, the system 100 can be configured to perform Doppler shift motion detection. In one embodiment, the spectrum 204, having a side lobe on the left of the peak 208, indicates that motion is detected and directed away from the receiver 112. Correspondingly, in the spectrum 206, the right-side lobe indicates that the motion is detected and directed towards the receiver 112. As such, by continually tracking the evolution of a side lobe with respect to time, i.e. by monitoring side lobe amplitude and/or width, and where it forms with respect to the peak 208, the system 100 can characterize motion based on the Doppler effect. Stated generally, the system 100 can perform motion estimation by monitoring Doppler shifts in measured ultrasonic signals.

Figure 3:
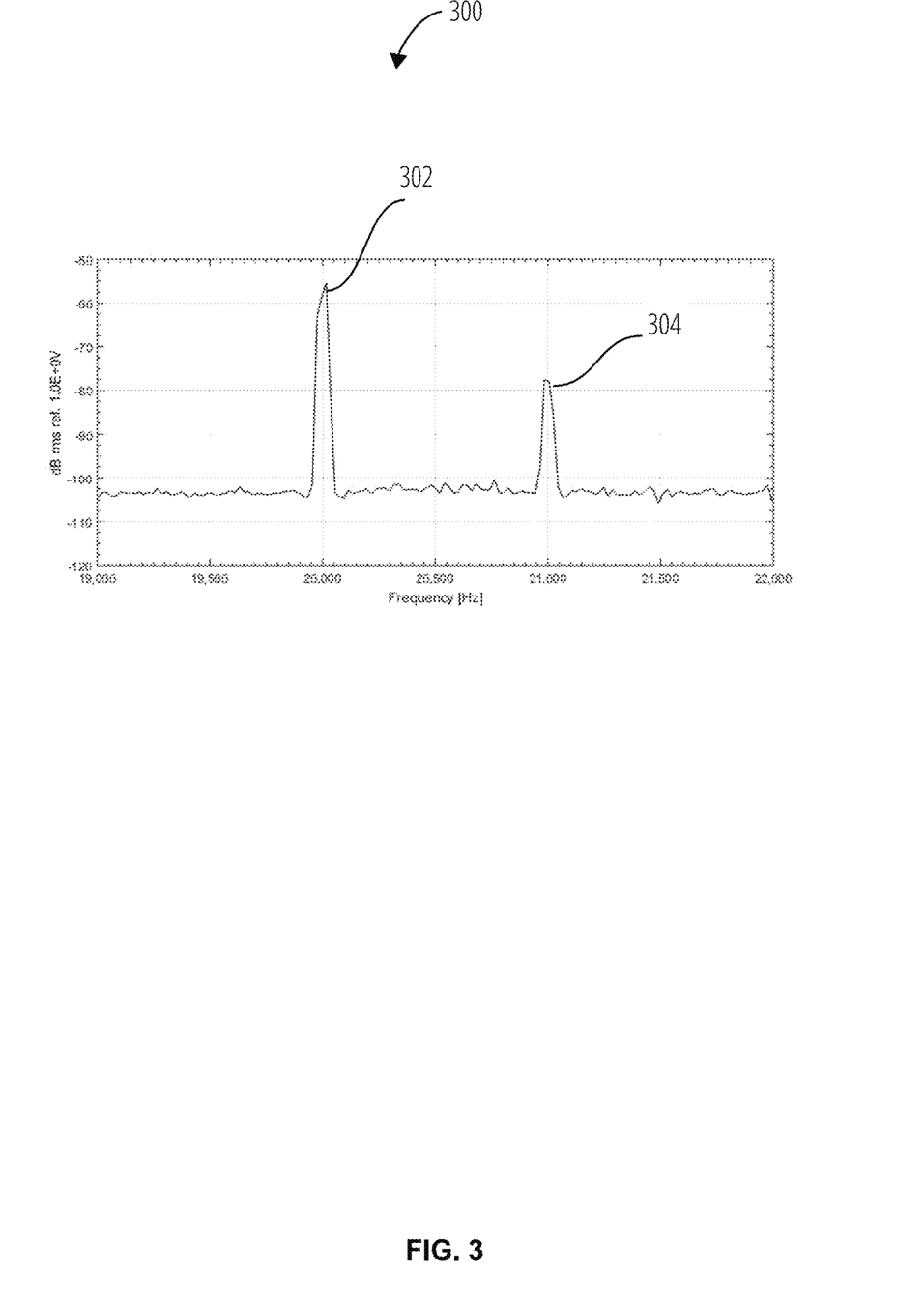
FIG. 3 illustrates a spectrum in accordance with one embodiment.

FIG. 3 illustrates a spectrum 300 characteristic with the system 100 being configured to perform multi-channel ultrasonic sensing and communication. Stated generally, in addition to being configured to perform motion detection, the system 100 can be simultaneously configured as a communications platform, where ultrasounds are used as a means of transmitting information to other systems that are communicatively coupled to the system 100, whether by an RF link via the RF device 104 or by an ultrasonic link via the transmitter 110.

In the exemplary embodiment of FIG. 3, the spectrum 300 includes a first channel 302 and a second channel 304. For simplicity, these two channels are described, but additional channels in the ultrasound range can be used. In this exemplary embodiment, the first channel 302 may be reserved for motion sensing, as described above with respect to FIG. 2. The second channel 304 may be used as control channel that is used to send messages to other devices that can transduce ultrasonic energy. As such, the system 100 can provide communication capability without the need for additional wireless network transceivers.

Figure 4:
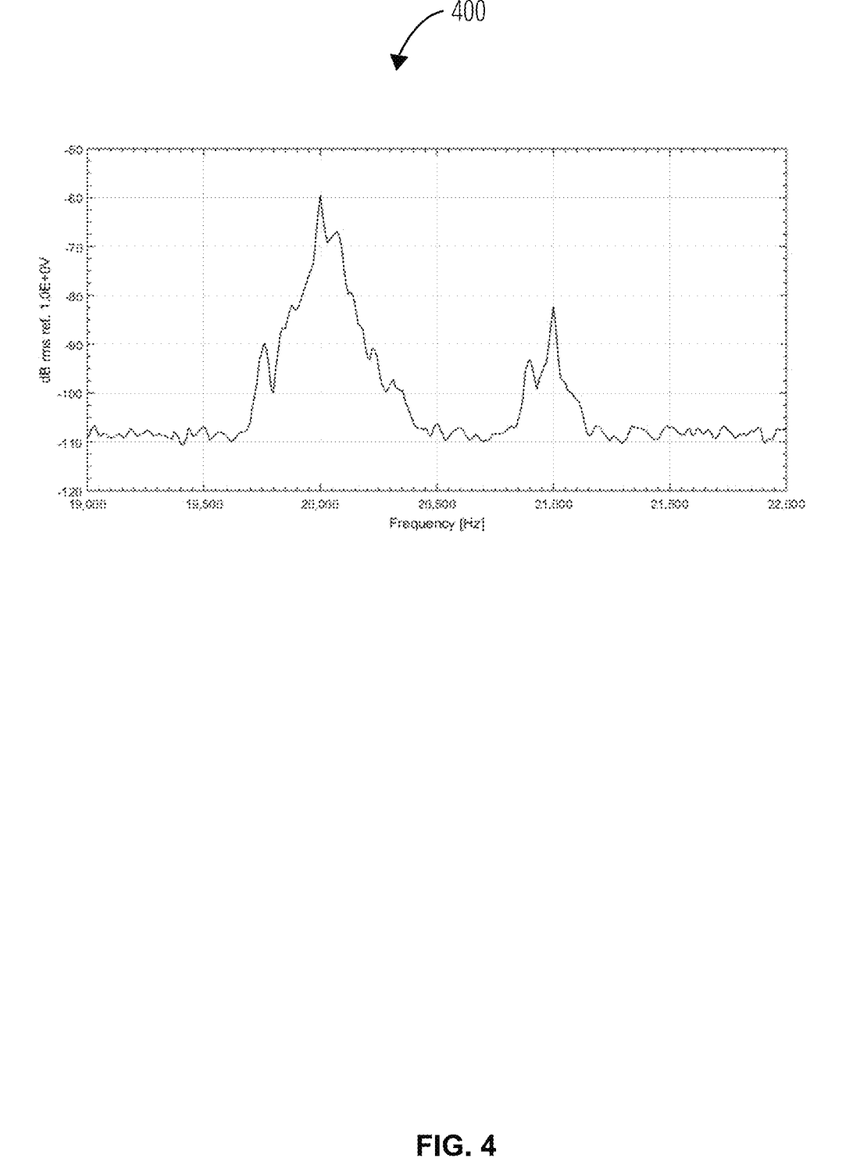
FIG. 4 illustrates a spectrum in accordance with one embodiment.

As shown in FIG. 4, when two or more channels are utilized in the ultrasound range of the acoustic spectrum, Doppler shift motion-based detection can also be manifested around frequencies associated with control. For example, as evidenced by the spectrum 400, waving a hand in front of the receiver 112 causes a noticeable broadening in both ultrasound peaks. As such, various gestures can be identified based on peak characteristics as a function of their location in the spectrum and as a function of time.

In yet another embodiment, the system 100 can be configured to perform as an acoustic transceiver that can gather information from the audio range (i.e., at frequencies less than about 20 kHz) while simultaneously gathering information in the ultrasound range (and/or issuing commands to other devices using ultrasounds).

Figure 5:
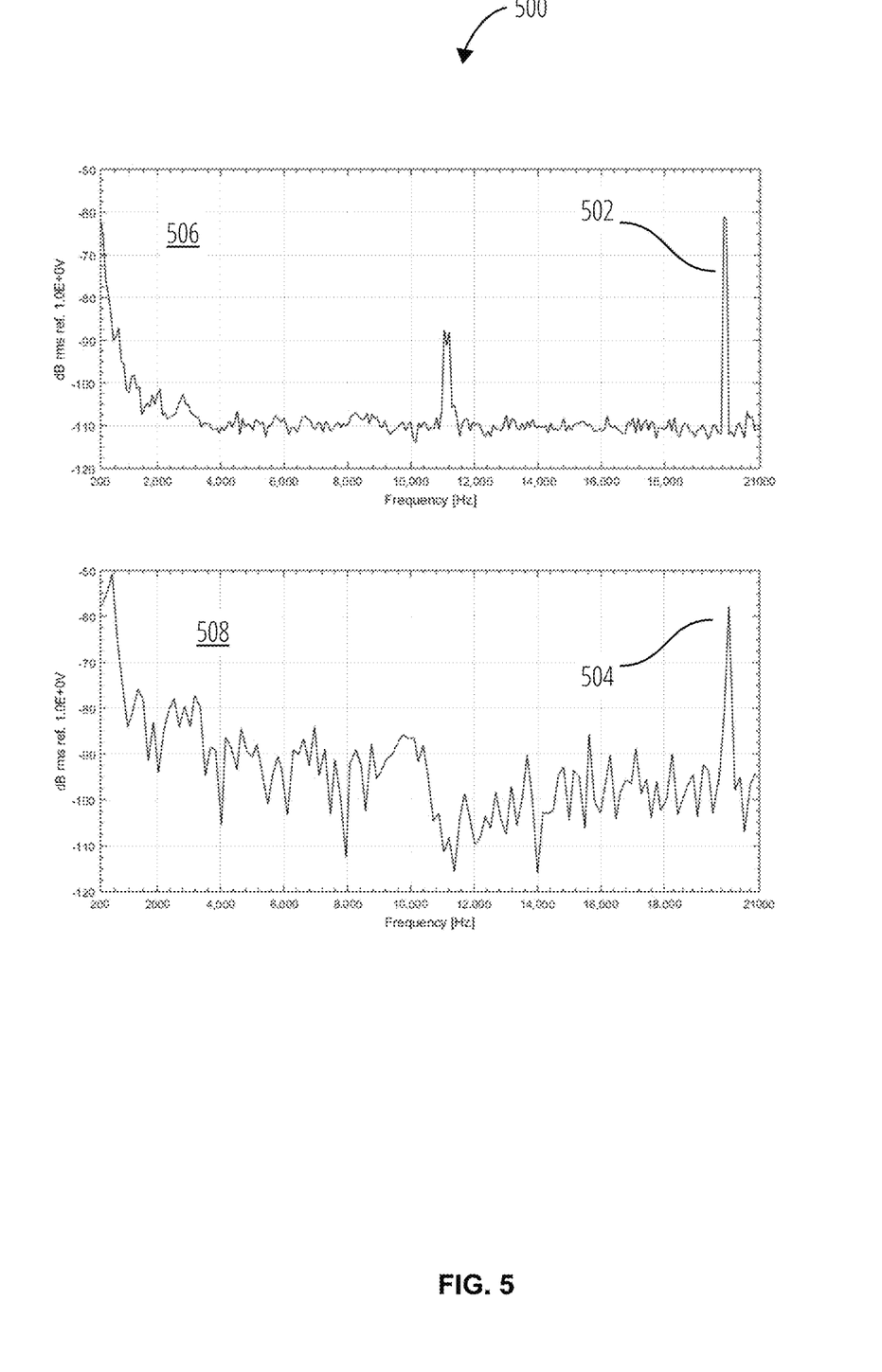
FIG. 5 illustrates a set of spectra in accordance with one embodiment.

For example, considering FIG. 5, the spectrum 506 shows the spectral content of a signal measured by the receiver 112. In this case, there is no significant background information in the audio range (about 200 Hz to less than about 20 kHz). Furthermore, the ultrasonic motion sensing channel 502 is isolated from the audio range. A control channel further up the ultrasound range can also be used independently of the audio range.

In the spectrum 508, there is a significant increase in the spectral content in the audio range, which may correspond to loud background noise in the room (e.g., many people talking at a party). As such, the system 100 can also ascertain presence in the room by monitoring the audio range and detecting whether there is a change from a baseline audio level. Nevertheless, as evidenced by the occurrence of the motion sensing channel 504 in the spectrum 508, the system 100 can still perform motion detection and classification. Thus, generally, the system 100 can use the audio and ultrasound ranges simultaneously and independently to perform a wide variety of tasks such as motion sensing, presence detection, and control.

Furthermore, in some embodiments, the system 100 can map an audio signal to an ultrasonic command. For instance, a voice command may be received by the system 100 and based on a speech recognition engine accessible by the microprocessor 106, the system 100 may instruct a device to perform an action consistent with the voice command. For example, a user may utter a command for a lighting system to turn on, and the system 100 can characterize that command and issue an ultrasound-based instruction to an ultrasound receiver-equipped lighting system.

Figure 6:
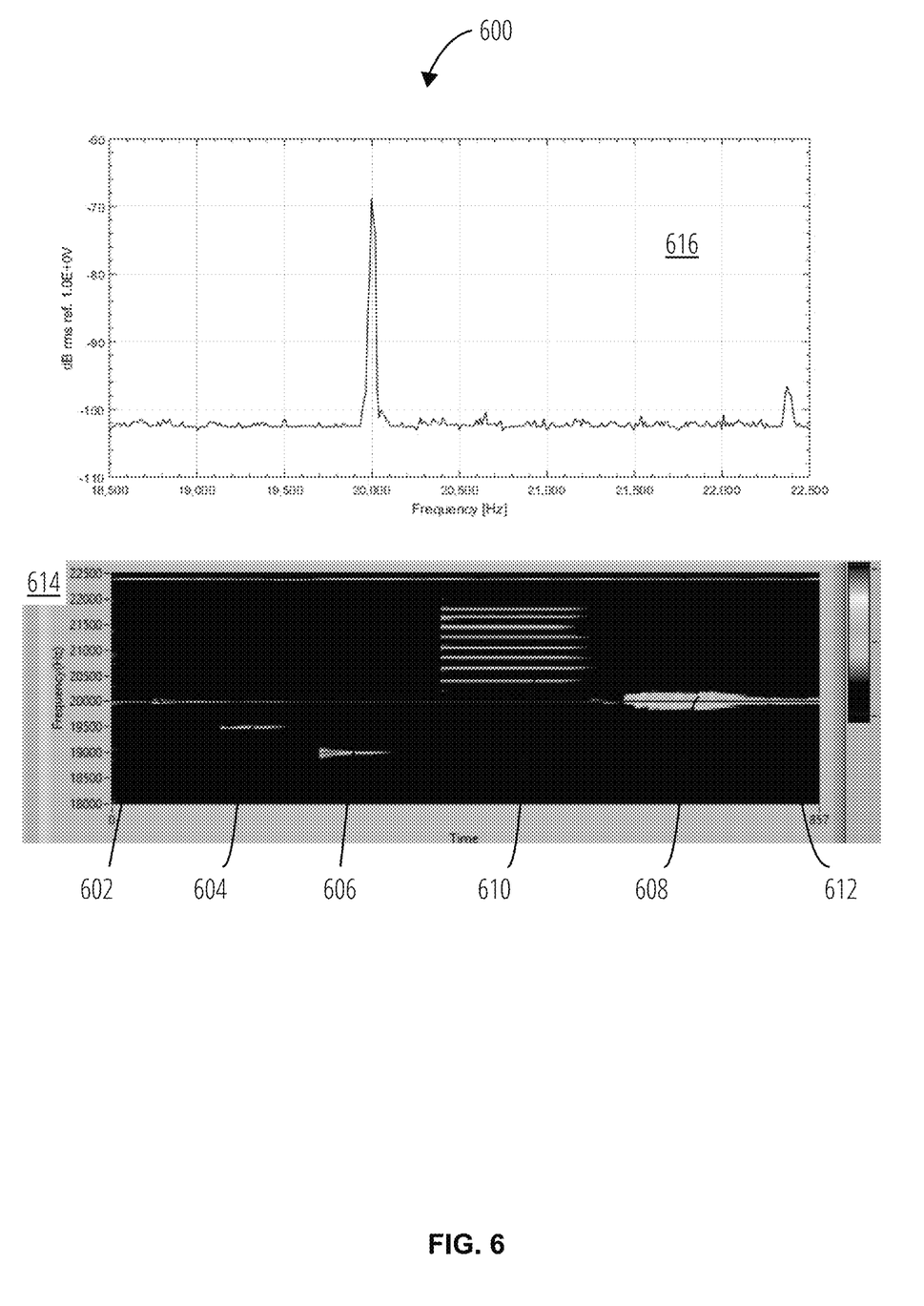
FIG. 6 illustrates a set of signals in accordance with one embodiment.

FIG. 6 illustrates the versatility of the system 100 as it is configured to utilize ultrasound information to perform a wide variety of tasks. The signals 600 show a spectrum 616 and frequency versus time panel 614. As shown in the spectrum 616, which represent a baseline signal transmitted by the transmitter 110 when there is no disturbance in the room, the spectral components of the signal measured by the receiver 112 includes a tone at about 20 kHz and another tone at about 21 kHz.

The panel 614 corresponds to the evolution of the frequency content of the signal measured when disturbances occur and/or when there is an increase in the audio signal level and/or when information is transmitted in an ultrasound control channel. In the panel 614, the feature 602 shows the 20 kHz baseline motion sensing channel. The feature 604 shows a digital command being sent to turn on a light and the feature 606 shows another digital command being sent to turn off a light.

Furthermore, the feature 610 represents 8-bits of control data that can be modulated in the ultrasound band to transmit digital words using ultrasounds. The feature 608 represent a horizontal hand wave in front of the receiver 112 and the feature 612 represent a vertical hand wave in front of the receiver 112.

Figure 7:
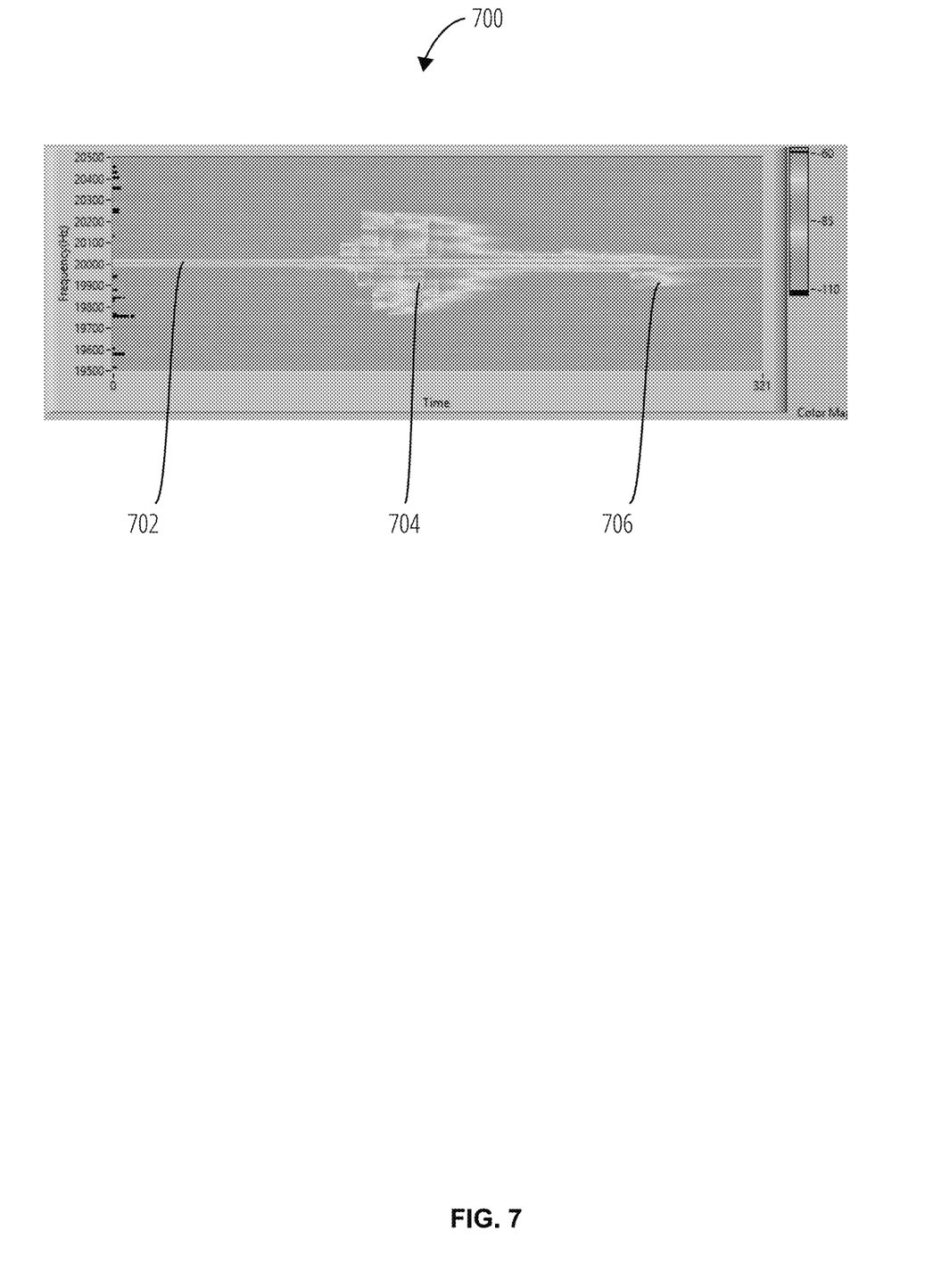
FIG. 7 illustrates a panel of signals in accordance with one embodiment.

The panel 700 is a detailed view of the frequency versus time diagram that is characteristics of the system 100 being configured to perform gesture characterization. The feature 702 represent the 20 kHz tone, and the feature 704 indicates a broadening around the 20 kHz peak that occurs as a result of a horizontal hand wave, and the feature 706 indicates a broadening that occurs around the 20 kHz peak as a result of a vertical hand wave.

Those skilled in the relevant art(s) will appreciate that various adaptations and modifications of the embodiments described above can be configured without departing from the scope and spirit of the disclosure. For example, while exemplary embodiments have described in the context of presence in and occupancy of a room, embodiments of the present disclosure can be deployed in other settings like a car windshield in order to detect rain or snow, or at an outdoor light fixture to determine changes in the weather or nearby traffic patterns, or for in a store to determine patron traffic and store occupancy.

Furthermore, embodiments of the system 100 can include all of the components shown or a subset. For example, in one implementation, a system may include a transmitter, so as to be able to emit an ultrasound signal in various channels of interest, and the receiver may be part of another exemplary system. In yet another implementation, several systems like the system 100 may be deployed, and they can cooperatively function to perform some or all of the functions described herein. Therefore, it is to be understood that, within the scope of the appended claims, the teachings featured herein may be practiced other than as specifically described herein.

What is claimed is:

1. A system, comprising:
   a processor;
   an ultrasonic transmitter configured to transmit an ultrasonic signal;
   a digital-to-analog converter configured to receive a digital word from the processor and output an analog voltage corresponding to the digital word to the transmitter, to thereby transmit the ultrasonic signal wherein the ultrasonic signal being of an intensity corresponding to the analog voltage;
   an ultrasonic receiver configured to measure the ultrasonic signal;
   an analog-to-digital converter configured to convert the ultrasonic signal into a digital word unique to the analog voltage of the ultrasonic signal; and
   a memory including instructions that, when executed by the processor, cause the processor to perform operations including:
      classifying a motion detected proximate to the ultrasonic receiver based on a Doppler shift observed in the ultrasonic signal measured by the ultrasonic receiver, wherein the classifying includes detecting a side lobe in a power spectrum of the ultrasonic signal to indicate that the motion has been detected wherein the power spectrum is indicative of a change in air pressure or in an acoustic baseline of an area.

2. The system of claim 1, wherein the classifying includes indicating that the motion is in a first direction towards the ultrasonic receiver when the side lobe is located on a higher frequency side of a specified ultrasonic peak frequency and that the motion is in a second direction away from the ultrasonic receiver when the side lobe is located on a lower frequency side of the specified ultrasonic peak frequency.

3. The system of claim 2, wherein the operations further include transmitting a narrow-band ultrasonic signal centered around the specified ultrasonic peak frequency.

4. The system of claim 1, wherein the ultrasonic signal includes a first peak frequency and a second peak frequency, the second peak frequency being restricted for control applications.

5. The system of claim 4, wherein the operations further include transmitting a digital word using a control ultrasonic signal at the second peak frequency.

6. The system of claim 1, wherein the classifying further includes categorizing a gesture based on a feature of the power spectrum.

7. A system, comprising:
a processor;
an ultrasonic transmitter configured to transmit an ultrasonic signal having a power spectrum including a first channel and a second channel being a control channel for sending messages to other devices;
a digital-to-analog converter configured to receive a digital word from the processor and output an analog voltage corresponding to the digital word to the transmitter, to thereby transmit the ultrasonic signal wherein the ultrasonic signal being of an intensity corresponding to the analog voltage;
an ultrasonic receiver configured to measure the ultrasonic signal;
an analog-to-digital converter configured to convert the ultrasonic signal into a digital word unique to the analog voltage of the ultrasonic signal,
a memory including instructions that, when executed by the processor, cause the processor to perform operations including:
sensing a motion based on the first channel of the ultrasonic signal which is an ultrasound region of the power spectrum of the ultrasonic signal measured at the ultrasonic receiver of the system; and
sensing a presence based on the second channel of the ultrasonic signal which is an audio region of the power spectrum;
wherein the ultrasound region and the audio region of the power spectrum are used simultaneously and independently and are isolated from one another.

8. The system of claim 7, wherein the audio region is from about 200 Hz to about 20 kHz.

9. The system of claim 7, wherein the ultrasound region begins from about 20 kHz.

10. The system of claim 7, wherein the sensing of the motion is based on features of the power spectrum at about 20 kHz.

11. The system of claim 7, wherein the sensing of the presence is based on detecting a change in a baseline audio level.

12. The system of claim 7, wherein the operations further include mapping an audio signal to an ultrasonic signal.

13. The system of claim 7, wherein the operations further include receiving an audio command and instructing, using an ultrasound, a remote device to perform an action consistent with the audio command.

14. The system of claim 7, wherein the sensing of the motion further includes gesture characterization.

15. The system of claim 14, wherein the gesture characterization is based on a broadening around an ultrasonic peak frequency.

16. A system, comprising:
a processor;
an ultrasonic transmitter configured to transmit an ultrasonic signal having a power spectrum including two or more channels;
a digital-to-analog converter configured to receive a digital word from the processor and output an analog voltage corresponding to the digital word to the transmitter, to thereby transmit the ultrasonic signal wherein the ultrasonic signal being of an intensity corresponding to the analog voltage;
an ultrasonic receiver configured to measure the ultrasonic signal;
an analog-to-digital converter configured to convert the ultrasonic signal into a digital command unique to the analog voltage of the ultrasonic signal;
a memory including instructions that, when executed by the processor, cause the processor to perform operations including:
transmitting, by the transmitter of the system, the ultrasonic signal including information centered around the two channels corresponding to at least two frequency peaks;
receiving the ultrasonic signal by a receiver of the system; and
determining whether a motion has occurred based on a signal characteristic associated with one of the at least two frequency peaks wherein the signal characteristic is a function of location and time.

17. The system of claim 16, wherein the at least two frequency peaks include 20 kHz and 21 kHz.

18. The system of claim 16, wherein the operations further including classifying the motion as either being away from the receiver or towards the receiver, based on the signal characteristic.

19. The system of claim 16, wherein at least one of the at least two frequency peaks is reserved for control and command of a device communicatively coupled to the system.

20. The system of claim 19, wherein the operations further include transmitting a digital word at the at least one of the at least two frequency peaks.

\* \* \* \* \*